United States Patent
Goudeau et al.

(10) Patent No.: US 6,215,092 B1
(45) Date of Patent: Apr. 10, 2001

(54) PLASMA OVERCLADDING PROCESS AND APPARATUS HAVING MULTIPLE PLASMA TORCHES

(75) Inventors: Jacques Goudeau, Hickory, NC (US); Pierre Ripoche, Pithiviers; Patrick Humbert, Paris, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/328,008

(22) Filed: Jun. 8, 1999

(51) Int. Cl.$^7$ .................................................. B23K 10/00
(52) U.S. Cl. ....................... 219/121.59; 427/573; 65/391; 164/46
(58) Field of Search ................. 219/121.59; 65/391, 65/378, 382, 421; 164/46

(56) References Cited

U.S. PATENT DOCUMENTS

| | | |
|---|---|---|
| 3,823,995 | 7/1974 | Carpenter . |
| 4,038,062 | 7/1977 | Presby . |
| 4,062,665 | 12/1977 | Izawa et al. . |
| 4,198,223 | 4/1980 | Goell et al. . |
| 4,221,825 | 9/1980 | Guerder et al. . |
| 4,243,298 | 1/1981 | Kao et al. . |
| 4,265,649 * | 5/1981 | Achener ................................. 65/391 |
| 4,294,601 * | 10/1981 | Dabby et al. ........................... 65/378 |
| 4,402,720 * | 9/1983 | Edahiro et al. ......................... 65/391 |
| 4,405,655 * | 9/1983 | Tuin ...................................... 427/573 |
| 4,915,717 | 4/1990 | Watanabe et al. . |
| 5,143,139 * | 9/1992 | Leatham et al. ........................ 164/46 |

(List continued on next page.)

FOREIGN PATENT DOCUMENTS

| | | | |
|---|---|---|---|
| 2 446 264 | 8/1980 | (FR) ............................... C03C/25/02 |
| 0 510 816 | 10/1992 | (FR) ............................... C03B/19/01 |
| 0863 108 | 9/1998 | (FR) ............................... C01B/33/12 |

OTHER PUBLICATIONS

M. Carratt et al., "MCVD–Plasma Process for Manufacturing Single–Mode Optical Fibers for Terrestrial Application"; Electrical Communication, pp. 11–14; 1994.

*Primary Examiner*—Teresa Walberg
*Assistant Examiner*—Quang Van
(74) *Attorney, Agent, or Firm*—Sughrue, Mion, Zinn, Macpeak & Seas, PLLC

(57) ABSTRACT

A method and associated apparatus for increasing the over cladding rate in perform production while maintaining the integrity of the glass quality of the cladding. The method and apparatus are designed to utilize the full capacity of the generator to thereby improve the overall deposition speed without sacrificing the glass quality. In particular, it is estimated that the process of the present invention will increase the deposition speed by approximately 50% and still obtain suitable glass quality. This object is achieved by utilizing two plasma torches, instead of just one, that are driven by the same power generator. The process of overcladding a perform includes the steps of supporting the perform on a lathe; providing first and second plasma torches having nozzles angled toward the perform; powering the first and second plasma torches with a common generator such that the plasma torches create plasma flames directed toward a surface of the perform; introducing a quartz sand at a junction between the first plasma torch and the surface of the perform to fuse the quartz sand on the surface of the perform; and moving the perform with respect to the plasma torches. According on one aspect of the invention, the second plasma torch is provided upstream of the first plasma torch so as to preheat the surface before the fusing of the quartz sand by the first plasma torch. According to a second aspect of the invention, the second plasma torch is located downstream of the first plasma torch to post-heat the quartz sand after the initial fusing by the first plasma torch. According to a third aspect of the invention, the quartz sand is introduced at a junctions between the surface of the perform and both of the plasma torches to fuse the quartz sand with both the first and second plasma torches simultaneously.

12 Claims, 3 Drawing Sheets

U.S. PATENT DOCUMENTS

| | | | |
|---|---|---|---|
| 5,192,350 | * | 3/1993 | Le Sergent ............................... 65/382 |
| 5,211,732 | * | 5/1993 | Abbott et al. ........................... 65/421 |
| 5,707,419 | | 1/1998 | Tsantrizos et al. . |
| 5,734,143 | | 3/1998 | Kawase et al. . |
| 5,868,815 | * | 2/1999 | DiGiovanni et al. ................... 65/382 |
| 5,958,102 | * | 9/1999 | Shimada et al. ....................... 65/382 |
| 5,970,750 | * | 10/1999 | Humbert et al. ....................... 65/391 |

* cited by examiner

PLASMA OVERCLADDING PROCESS AND APPARATUS HAVING MULTIPLE PLASMA TORCHES

BACKGROUND OF THE INVENTION

1. Field of the Invention

The present invention relates to a method and associated apparatus for increasing the over cladding rate in perform production while maintaining the integrity of the glass quality of the cladding.

2. Discussion of Related Art

Due to the market pressure to decrease the price of optical fibers, there is a continuous demand to increase the overall productivity of the fabrication process. One of the first steps in the process of manufacturing an optical fiber is the plasma process. This process involves making more than 90% of the preform glass by fusing quartz sand onto the primary preform as a cladding with the aid of a hot plasma fireball.

There are two important parameters associated with this process. The first is the deposition speed (grams/min.) Of the glass and the second is the quality of the deposited glass. For a particular process, these two parameters are antagonistic to each other. Specifically, as the deposition speed increases, the glass quality is degraded.

Both of these parameters are affected by the usable power available to generate the plasma fireball. The higher the power, the greater the deposition speed and the better the glass quality. However, the conventional plasma setup has limited power capability. This limitation is not due to the output of the generator, but to the thermal resistance of the plasma torch. When the power in the plasma torch reaches a given value, the plasma torch cannot sustain the required temperature and its lifetime is shortened. It is estimated that the plasma torch only uses approximately ⅔ of the output capacity of the generator.

Conventional processes only use a single plasma torch such as is disclosed in U.S. Pat. No. 4,221,825. Thus, the full capacity of the generator is not realized and the deposition speed and quality of glass are limited.

SUMMARY OF THE INVENTION

An object of the invention is to utilize the full capacity of the generator to thereby improve the overall deposition speed without sacrificing the quality of the glass. In particular, it is estimated that the process of the present invention will increase the deposition speed by approximately 50% for a given glass quality. This object is achieved by utilizing two or more plasma torches, instead of just one, that are driven by the same power generator.

Thus the present invention is directed to a process and apparatus for applying quartz sand to a perform. The process of over cladding a perform includes the steps of supporting the perform on a lathe; providing first and second plasma torches having nozzles angled toward the perform; powering the first and second plasma torches with a common generator such that the plasma torches create plasma flames directed toward a surface of the perform; introducing a quartz sand at a junction between the first plasma torch and the surface of the perform to fuse the quartz sand on the surface of the perform; and moving the perform with respect to the plasma torches.

According on one aspect of the invention, the second plasma torch is provided upstream of the first plasma torch so as to preheat the surface before the fusing of the quartz sand by the first plasma torch. According to a second aspect of the invention, the second plasma torch is located downstream of the first plasma torch to heat up the quartz sand after the initial fusing by the first plasma torch. According to a third aspect of the invention, the quartz sand is introduced at junctions between the surface of the perform and both of the plasma torches to fuse the quartz sand with both the first and second plasma torches simultaneously.

The apparatus for performing this process includes a lathe for supporting the preform; first and second plasma torches having nozzles angled toward the perform; a generator for powering the first and second plasma torches such that the plasma torches create plasma flames directed toward a surface of the preform; one or more feeder(s) for feeding the quartz sand at a junction between the one of the torches and the surface of the preform to fuse the quartz sand on the surface of the perform; and means for moving the preform with respect to the plasma torches.

BRIEF DESCRIPTION OF THE DRAWINGS

The advantages, nature and various additional features of the invention will appear more fully upon consideration of the illustrative embodiment of the invention which is schematically set forth in the drawings, in which.

DETAILED DESCRIPTION OF THE INVENTION

A conventional process for manufacturing an optical fiber includes a first step involving modified chemical vapor deposition (MCVD) to form a primary preform 14, a second step of plasma over cladding to form an overclad preform 15 and a third step of drawing the preform to form the optical fiber.

Figure 1:
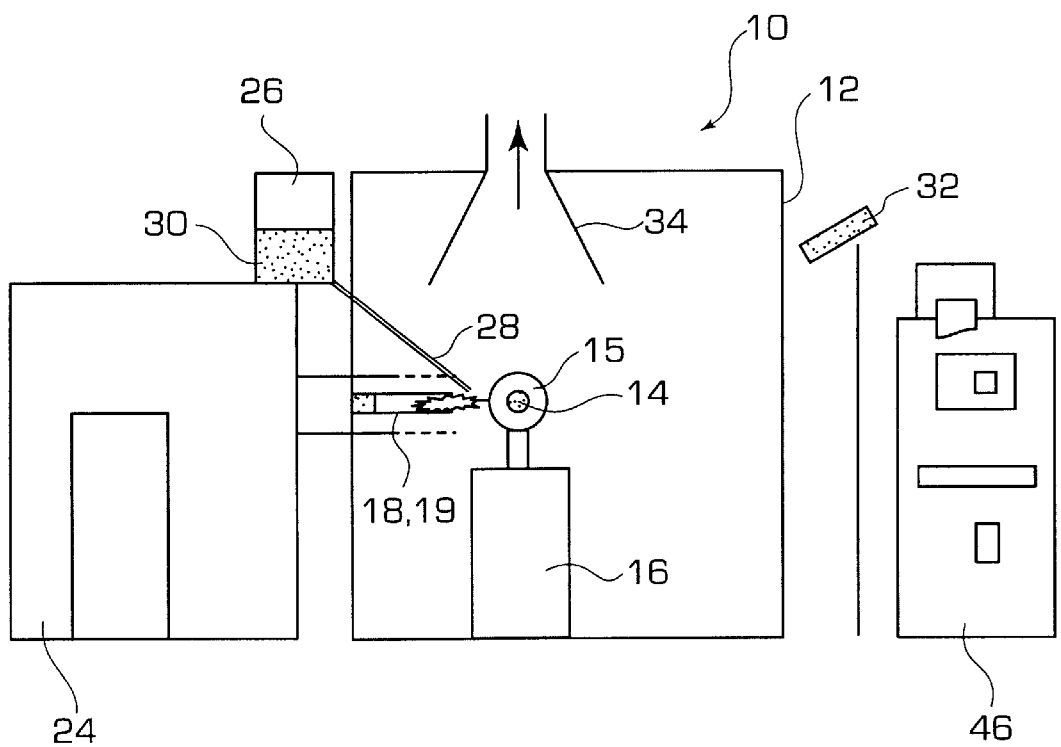
FIG. 1 is a side view of an illustrative apparatus for performing the over-cladding step according to the invention.

The present invention is directed to an improvement in the over cladding step. As noted above, this step of the process is directed to increasing the diameter of the preform and involves fusing quartz sand onto the surface of the primary preform 14 acting as a target. The invention will be described in detail with reference to FIGS. 1–3. FIG. 1 is a side view of an illustrative apparatus for performing the over-cladding step according to the invention, FIG. 2 is a perspective view showing the two plasma torches and FIG. 3 is a perspective view showing the coil arrangement of the plasma torches.

Figure 2:
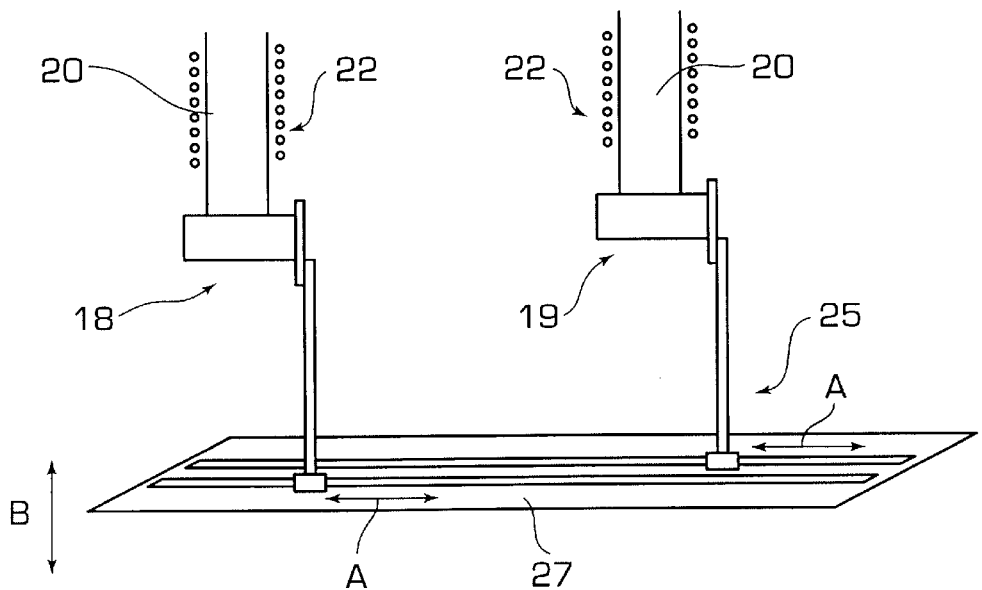
FIG. 2 is a perspective view showing the two plasma torches.
Figure 3:
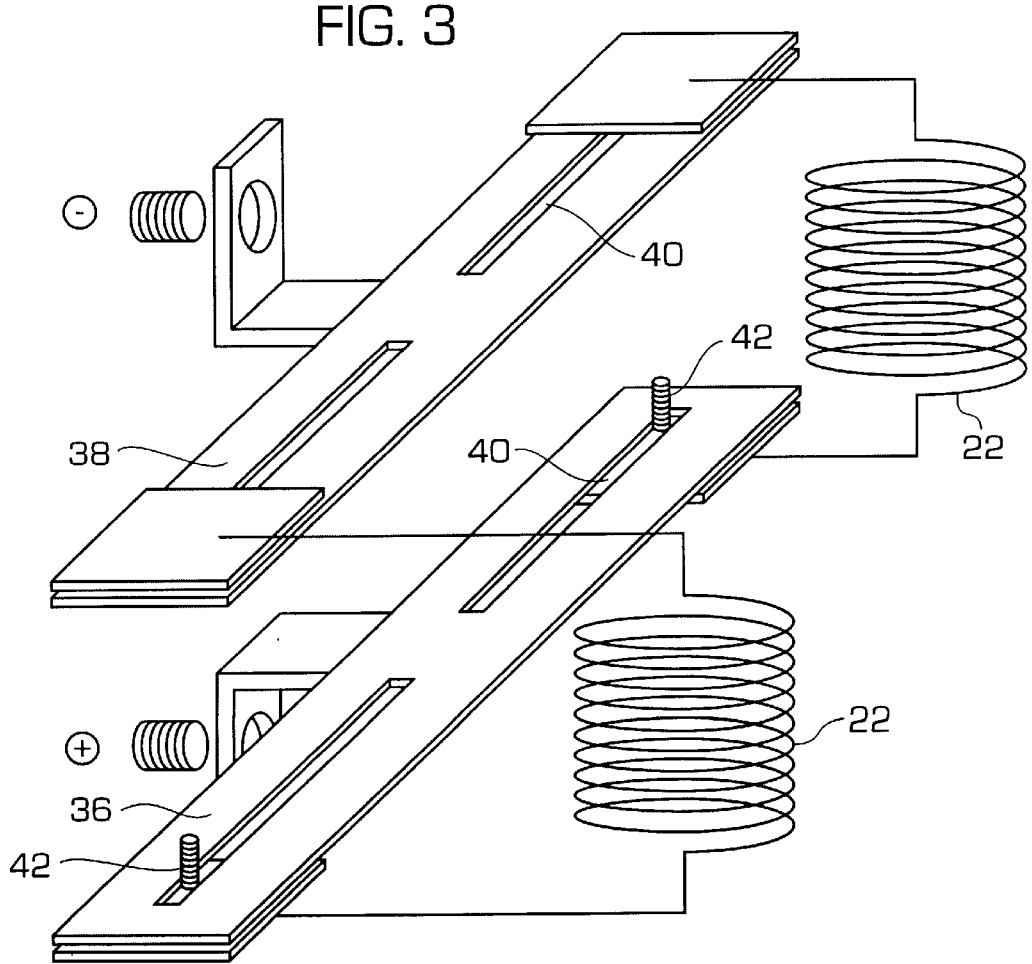
FIG. 3 is a perspective view showing the coil arrangement of the plasma torches.

Referring to FIGS. 1 and 2, the over cladding apparatus 10 includes a plasma chamber 12 in which a primary perform 14 is located. The primary perform 14 is supported between chucks of a conventional glass-working lathe 16. The lathe 16 is capable of rotating the preform about its longitudinal axis, longitudinally translating the preform (i.e., in and out of the paper in FIG. 1) and adjusting the distance between the torches and the preform.

The apparatus further includes two plasma torches 18, 19 located inside the plasma chamber 12. Each of the plasma torches includes a tube tubes 20 surrounded by an induction coil 22 which is electrically connected to a high-frequency generator 24. The torches are either water cooled or air cooled. The plasma torches 18, 19 are moveably supported as shown by arrows A and B in FIG. 2 so that their positions can be adjusted along the length of the preform 14 (arrows A) and radially of the preform (arrow B). Specifically, the plasma torches are moveably supported by isolating members 25 which slide in grooves provided in a base member 27.

The end of the silica tube has a nozzle through which a conventional plasma generating gas such as air, pure oxygen, or a mixture thereof, is introduced. The coil 22 surrounding each of the tubes 20 creates a high electromagnetic field in the air flowing into the torches. As soon as the plasma is initiated by means of an igniter, the generator power (in the range of e.g., 50 to 200 kW) is fed to each of the plasma torches to create a plasma fireball that is capable of reaching 10,000° centigrade. Of course, it is understood that the invention is not limited to a particular type generator or a specific range of power generated thereby.

A grain feeder 26 having a tube injector 28 is placed along side of at least one of the plasma torches 18 with the tube injector angled toward the plasma torch. The injector 28 delivers quartz sand 30 stored in the grain feeder 26 to the plasma torch whereupon the quartz grain is rapidly heated and fused onto the rotating and translating preform 14. This process is continues until glass layers are built up on the preform 14 to a predetermined diameter to form the overclad preform 15. The diameter of the preform is monitored by a camera 32. Hot air and silica fumes are removed from the plasma chamber 12 via an exhaust hood 34.

FIG. 3 is a schematic illustration of the arrangement of the coils 22 that are driven by the common generator 24. The arrangement includes a high tension electrode 36 and a ground electrode 38 that are respectively electrically connected to the high tension and ground terminals of the power generator 24. The electrodes have longitudinal slots 40 therein for receiving a screw 42 for fastening the coils 22 to the electrodes. The slots 40 allow for the coils 22 to be moved along the electrodes 36, 38 to change the spacing between the coils. This is important to enable the plasma torches to be properly positioned depending on the mode of operation, as discussed in greater detail below.

Control of the entire process, including the movement of the preform 14, is controlled by an industrial programmable logic controller (PLC) 46 located outside of the plasma chamber.

As noted above, the efficiency of the process is characterized by the deposition speed of the quartz sand (i.e., the quantity of sand deposited on the preform as glass), the glass quality and the grain yield (i.e., the ratio of amount of grain deposited on the preform to the amount of grain injected in %).

The presence of two plasma torches 18, 19 improves the efficiency of the process in the following respects. There are three preferred techniques for over-cladding using the two plasma torches.

Figure 4:
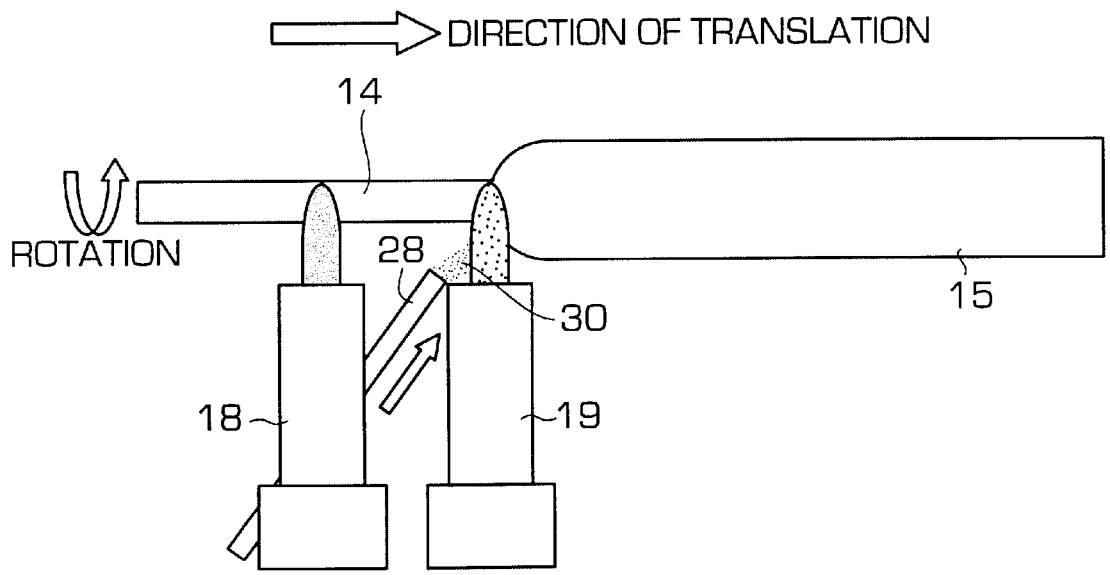
FIG. 4 is a perspective view showing one aspect of the invention where the second plasma torch is provided upstream of the first plasma torch so as to preheat the surface before the fusing of the quartz sand by the first plasma torch.

According to the first aspect of the invention, one of the plasma torches 18 is located upstream of the other plasma torch 19 and functions to preheat the preform 14 prior to the deposition of the quartz sand by the other, downstream, plasma torch 19. An example of this arrangement is shown in FIG. 4 of the application. Referring to FIG. 4, the preform is moved longitudinally in the right-hand direction (see arrow) with the two plasma torches being longitudinally offset from each other. A tube injector 28 injects the quartz sand 30 to the downstream, plasma torch 19. The upstream, plasma torch 18 is not fed with the quartz sand. Instead, the upstream torch 18 preheats the preform to improve the over cladding performed by the downstream torch 19.

It has been discovered that for a given deposition speed the quality of the deposited glass is substantially better when the preform has been preheated than without preheating. Conversely, preheating of the preform allows the deposition speed to be increased without adversely impacting the quality of the glass.

Figure 5:
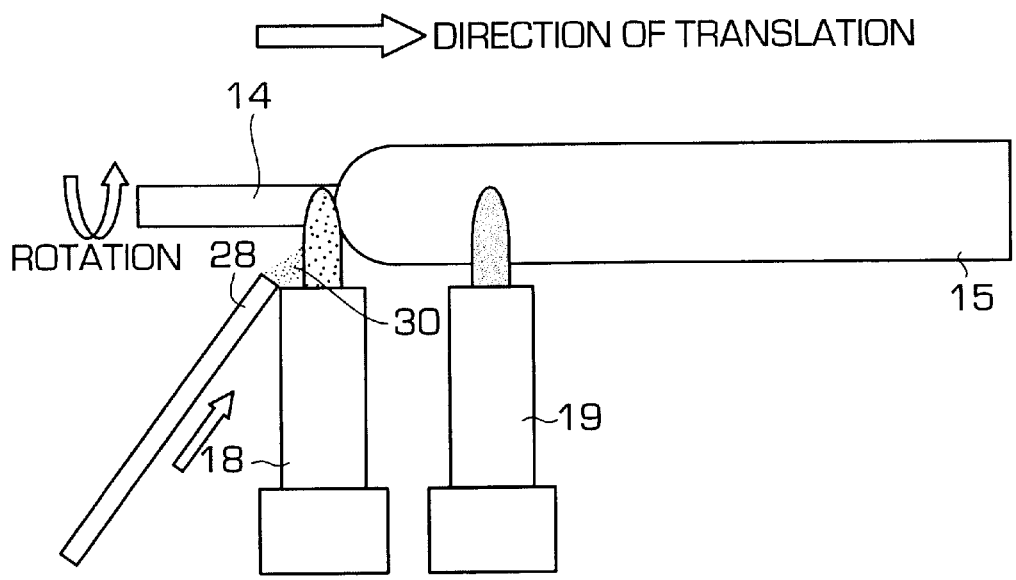
FIG. 5 is a perspective view showing a second aspect of the invention where the second plasma torch is located downstream of the first plasma torch to post-heat the quartz sand after the initial fusing by the first plasma torch.

According to the second aspect of the invention, one of the plasma torches is depositing the quartz sand, and the other plasma torch is post-heating the glass, as shown in FIG. 5. In contrast to the previous embodiment of FIG. 4, in this embodiment, the quartz sand is fed to the upstream plasma torch 18, but not to the downstream plasma torch 19. Thus, the downstream plasma torch 19 functions to post-heat the quartz sand on the surface of the preform (i.e., to post-heat the overclad preform 15) after the initial fusing by the upstream plasma torch 18.

The post-heating of the glass refines the glass quality and minimizes bubbles formation. As with the previous technique, it has been determined that for a given deposition speed the quality of the deposited glass is improved using the two plasma torches over the conventional single plasma torch method. Conversely, the deposition speed can be increased without adversely impacting the glass quality when compared to the conventional technique.

Figure 6:
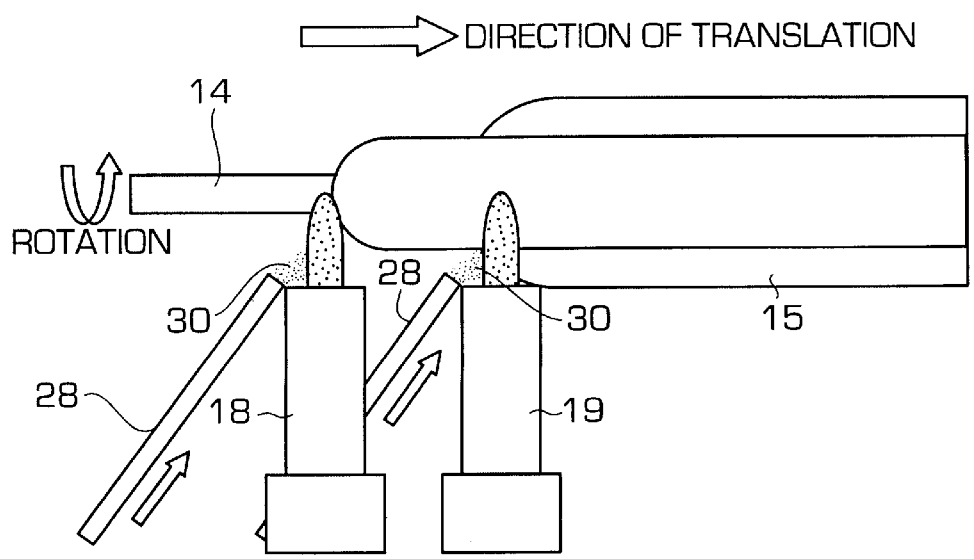
FIG. 6 is a perspective view showing a third aspect of the invention where the quartz sand is introduced at junctions between the surface of the preform and both of the plasma torches to fuse the quartz sand with both the first and second plasma torches simultaneously.

According to another aspect of the invention, the two torches 18, 19 are used to deposit the quartz grain simultaneously to form the overclad preform 15. This technique is shown in FIG. 6. Referring to FIG. 6, the tube injectors 28 deliver the quartz sand to each of the plasma torches 18, 19 such that quartz sand 30 is simultaneously fused to the surface of the preform 14 at different longitudinal locations. This allows the grain flow to be lowered for each plasma torch to improve the quality of the glass, while maintaining or increasing the deposition speed, as compared to a single torch process. According to an alternative embodiment, it is possible to simultaneously deposit two different types of grain using different plasma gases and/or different injection gases.

As can be seen from the foregoing, the process and apparatus of the present invention, which utilized two plasma torches 18, 19, substantially improves the efficiency of the system by maximizing the output of the common generator 24. As noted above, the limiting element in the conventional single plasma torch process is the plasma torch; the generator is operated at a relatively low power to reduce the operating temperature of the plasma torch and thereby maximize the life of the plasma torch. By providing two plasma torches that are powered by a common generator, the efficiency of the process is improved by maximizing the output of the generator. That is, the generator can operate at a higher designed power and the plasma torches can operate within an acceptable temperature range while dramatically increasing the deposition speed of the process and/or improving the quality of the glass.

Having described the invention with particular reference to the preferred embodiments, it will be obvious to those skilled in the art to which the invention pertains after understanding the invention, that various modifications and changes may be made therein without departing from the spirit and scope of the invention as defined by the claims appended hereto. For example, instead of using just two plasma torches, it is understood that three or more plasma torches can be used.

What is claimed is:

1. A process of over-cladding an external surface of a preform, comprising the following steps:

supporting said preform on a lathe;

providing first and second plasma torches having nozzles angled toward said preform;

powering said first and second plasma torches with a common generator such that said plasma torches create plasma flames directed toward a surface of said preform;

introducing a quartz sand at a junction between at least one of said first and second plasma torches and said external surface of said preform to fuse said quartz sand on said external surface of said preform; and moving said preform with respect to said plasma torches.

2. The process of claim 1, wherein said second plasma torch is provided upstream of said first plasma torch so as to preheat said external surface of said preform prior to the fusing of the quartz sand by the first plasma torch.

3. The process of claim 1, where said second plasma torch is located downstream of said first plasma torch to post-heat said surface after the initial fusing of the quartz sand by said first plasma torch.

4. The process of claim 1, wherein said introducing step further includes introducing additional said quartz sand at a junction between said second plasma torch and said external surface of said preform to fuse quartz sand with both said first and second plasma torches simultaneously.

5. The process of claim 1, wherein said moving step include rotating said preform on said lathe.

6. The process of claim 5, wherein said moving step also include translating said preform with respect to said first and second plasma torches in a direction parallel to the longitudinal axis of said preform.

7. An apparatus for applying quartz sand to a preform, comprising:

a lathe for rotatably supporting said preform;

first and second plasma torches having nozzles angled toward said preform;

a generator for powering said first and second plasma torches such that said plasma torches create plasma flames directed toward an external surface of said preform;

a feeder for feeding the quartz sand at a junction between at least one of said first plasma torches and said external surface of said preform to fuse said quartz sand on said external surface of said preform; and means for moving said preform with respect to said plasma torches.

8. The apparatus of claim 7, wherein said second plasma torch is provided upstream of said first plasma torch so as to preheat said external surface of said preform prior the fusing of said quartz sand on said external surface by said first plasma torch.

9. The apparatus of claim 7, where said second plasma torch is located downstream of said first plasma torch to post-heat said surface after the fusing of said quartz sand on said external surface by said first plasma torch.

10. The apparatus of claim 7, further comprising another feeder for feeding additional quartz sand to a junction between said second plasma torch and said external surface of said preform to fuse quartz sand with both said first and second plasma torches simultaneously.

11. The apparatus of claim 7, wherein said moving means includes means for rotating said preform on said lathe.

12. The apparatus of claim 7, wherein each of said first and second plasma torches includes a coil which is electrically connected to said generator.

* * * * *